USOO5652200A

United States Patent [19]
Davies et al.

[11] Patent Number: 5,652,200
[45] Date of Patent: Jul. 29, 1997

[54] WATER BASED DRILLING FLUID ADDITIVE AND METHODS OF USING FLUIDS CONTAINING ADDITIVES

[75] Inventors: Stephen Nigel Davies, Over; Gerald Henry Meeten, Ware; Paul William Way, Hauxton, all of England

[73] Assignee: Schlumberger Technology Corporation, Houston, Tex.

[21] Appl. No.: 518,662

[22] Filed: Aug. 24, 1995

Related U.S. Application Data

[63] Continuation of Ser. No. 238,294, May 5, 1994, abandoned.

[30] Foreign Application Priority Data

May 7, 1993 [GB] United Kingdom ............... 9309439

[51] Int. Cl.[6] ........................................... C09K 7/02
[52] U.S. Cl. ..................... 507/100; 507/135; 507/906; 507/940
[58] Field of Search ........................ 507/100, 906, 507/940, 135

[56] References Cited

U.S. PATENT DOCUMENTS

| | | |
|---|---|---|
| 3,125,517 | 3/1964 | Voda . |
| 3,229,777 | 1/1966 | Rogers et al. . |
| 3,269,468 | 8/1966 | Phansalkar et al. . |
| 3,509,951 | 5/1970 | Enochs . |
| 3,575,883 | 4/1971 | Foley . |
| 3,642,623 | 2/1972 | Bennett et al. . |
| 3,994,826 | 11/1976 | Muzyczko et al. . |
| 4,148,736 | 4/1979 | Meister . |

OTHER PUBLICATIONS

Gray et al "Composition and Properties of Oil Well Drilling Fluids", Gulf Publishing Co, Houston, 1980, pp. 293–297.
G. V. Chilingarian and P. Vorabutr, "Drilling and Drilling Fluids", Developments in Petroleum Science,11 ; 1983.
A. Hartmann, M. Ozerler, C. Marx, and H.-J. Neumann, "Analysis of Mudcake Structures Formed Under Simulated Borehole Conditions", SPE 15413, Society of Petroleum Engineers, 1986.

*Primary Examiner*—Philip Tucker
*Attorney, Agent, or Firm*—John E. Vick, Jr.

[57] ABSTRACT

An additive for a water-based fluid which is to be used when the likelihood of differential sticking is high and which reduces the sticking tendency of the fluid and mud cake. An additive according to the invention comprises a well dispersed-particulate phase such as an emulsion, a fine emulsion, a microemulsion, a micellar phase or a polymeric phase having a particle size comparable with the pore throat size of a mud cake and comprising a material which forms easily deformable particles and which reduces the sticking propensity of the mud. One embodiment of the invention comprises a microemulsion of an oil which is well dispersed, substantially stable and has a substantial portion of the particle size distribution in the range 5–500 nm. An alternative embodiment comprises a micellar phase comprising one or more surfactants. The additive is typically used at a level of about 5% by volume in the drilling fluid.

2 Claims, 1 Drawing Sheet

10

WATER BASED DRILLING FLUID ADDITIVE AND METHODS OF USING FLUIDS CONTAINING ADDITIVES

This application is a file wrapper continuation of U.S. application Ser. No. 08/238,294 filed May 5, 1994, now abandoned.

The present invention relates to a series of additives for use in water-based drilling fluids which can reduce the likelihood of differential sticking of drill pipe, logging tools or coiled tubing when drilling oil or gas wells or the like.

In the rotary drilling of oil or gas wells, a drilling fluid is used which is pumped down into the well inside the drill string and returns to the surface via the annulus formed by the outside of the drill suing and the well bore. The drilling fluid typically comprises a liquid carrier, usually water (or brine) but sometimes oil, a viscosifier which is often bentonite clay, a weighting agent such as barite, and a number of additives for modifying the properties of the fluid. As the drilling takes place, a certain amount of liquid phase can sometimes permeate into the drilled rock causing the solids to be filtered at the borehole wall so as to form a filter cake or mud cake. The mud cake prevents further fluid loss to some degree. However, if the mud cake continues to grow there is a danger of differential sticking of the drill pipe. Differential sticking occurs when the mud cake of a water-based fluid grows so as to contact the drill pipe and will typically occur when the pipe is not rotating or otherwise moving (this happens to a much less degree with oil-based fluids). The pipe sticks when the torque or overpull which is available is insufficient to free the pipe from the mud cake. Various additives have been proposed to assist in freeing stuck drill pipe, the most common of which is diesel oil which is added directly to the drilling mud as a "spotting fluid". However this is not always successful.

It is an object of the present invention to provide an additive for a water-based fluid which is to be used when the likelihood of differential sticking is high and which reduces the sticking tendency of the fluid and mud cake.

An additive according to the present invention comprises a well dispersed particulate phase having a substantial portion of the particle size comparable with the pore throat size of a mud cake and being deformable so as to provide little effective resistance to an applied shear stress.

It is preferred that the particulate phase has a relatively broad particle size distribution so as to correspond to the distribution of pore throat size in the mud cake.

The invention typically comprises an emulsion such as a fine emulsion, or a microemulsion or a micellar phase having a substantial portion of the particle size distribution in the range 5–500 nm. One embodiment of the invention comprises an oil-in-water microemulsion.

In an alternative embodiment, the additive comprises a micellar phase comprising one or more surfactants.

In a further alternative embodiment, the additive comprises a polymeric material, such as a soft microgel or high molecular weight individual molecules.

A typical additive comprising an oil-in-water microemulsion might comprise 40% by volume oil and 60% by volume surfactant. The oil may be a single oil or a mixture of different oils. The oils can be mineral, animal or vegetable oils. The surfactant can be anionic, cationic or non-ionic, anionic surfactants such as sulphonates being preferred. Secondary surfactants or cosurfactants such as ethylene glycol or diethylene glycol can be used and an ionic surfactant such as the sodium salt of dodecyl benzene sulphonic acid can be used. An additive of this type might be used at a level of about 5% by volume in the water-based drilling fluid. The resultant emulsion might have the following properties:

- the emulsion structures are formed on a smaller length scale than traditional polymeric fluid loss control agents, so as to block pores in the mud cake decreasing fluid loss and cake growth.
- the surfactant adsorbs preferentially onto the surfaces of clay or other minerals such as barite so as to allow more efficient packing and so less permeable cakes which inhibit fluid loss and cake growth.
- the dispersed phase remains in the cake and becomes a fluid pan of its structure, thus reducing the yield strength of the cake.
- excess surfactant, the emulsion structures or both may lubricate the interface between the pipe and the mud cake.

When the additive comprises a micellar phase, it is preferred that an anionic surfactant is used although non-ionic and cationic surfactants might also be suitable. Typically, the surfactant is a salt of dodecyl benzene sulphonic acid. This is usually the isopropylamine salt although the potassium or calcium salts may also be used. A mixture of surfactants can be used to provide a micellar phase such as mixtures of anionic and nonionic surfactants eg sodium and isopropylamine salts of dodecyl benzene sulphonic acid with coconut diethanolamide. The surfactants forming the micellar phase are typically present at a level of about 5% by volume in the water-based drilling fluid.

A water-based drilling fluid incorporating the micellar phase additive might have the following composition:

| Component | |
|---|---|
| anionic surfactant | } 5% volume total |
| co-surfactant (optional) | |
| inorganic salt | 4–6 gl$^1$ |
| bentonite clay | 40–80 gl$^{-1}$ |
| fluid loss control polymer, eg CMC | 3 gl$^{-1}$ |
| antifoaming agent | <1 gl$^{-1}$ |
| weighting agent | as required |

Figure 1:
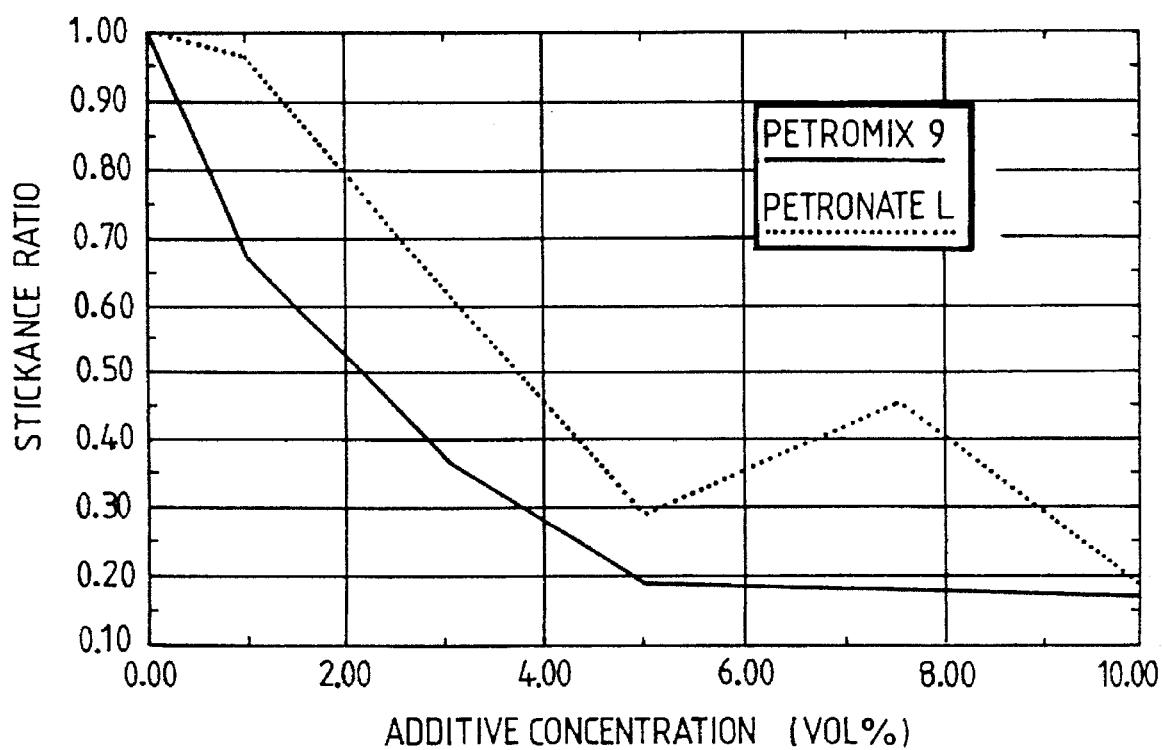
FIG. 1 shows the variation in stickance ratio with additive concentration.

The various aspects of the present invention will now be described with reference to illustrative examples and to the accompanying drawing which shows a plot of the variation in stickance ratio with additive concentration.

In the following examples, the performance of the various additives is assessed by two main tests. The differential sticking propensity (hereinafter "stickance") is the scaled rate of increase of torque required to initiate rotation of a spherical body after a mud cake has formed. The device used to measure this property and the general method used is described in British Patent Application No. 9303321.5. In the present case, performance data is derived by comparing the performances of a water-based fluid comprising 20% volume barite, CMC, salt, polymeric thinner and a biocide, with and without the relevant additive, the results being expressed as a ratio. An additive which provides a ratio of 1 has no effect while a ratio of 0 indicates that the sticking tendency has been eliminated completely.

EXAMPLE 1

The additive in this case is either Petromix 9, a blend of petroleum sulphonates, cosurfactants and oil, or Petronate L surfactant and oil blend which forms a microemulsion or free emulsion when added to the mud. FIG. 1 shows the variation of stickance ratio with additive concentration for both Petromix 9 and Petronate L in the general mud formulation given above. 5% by volume appears to be the optimum level with little extra benefit being obtained above this level.

Petromix 9 is sold as an oil-soluble emulsifier for use as a soluble cutting oil, textile processing oil or metal degreaser and Petronate L as a surfactant. Both are available from Witco BV, Worcester, UK.

EXAMPLE 2

The effect of different suffactant to oil ratio is shown in Table 2. In this case, the (micro) emulsion is formed from IDBS and PLANTOHYD oil in the mud. Little reduction in sticking is seen with 5% volume oil alone but as the proportion of surfactant increases the stickance decreases. The mean particle size of the emulsion also decreased with increasing surfactant concentration although addition of IDBS above 60% volume leads to detrimental gelling of the mud.

EXAMPLE 4

Further examples of (micro) emulsion additives were created by mixing various surfactants with a mineral oil and the mixtures were added to the standard mud and stickance ratio and fluid loss measured as before. The various surfactants and surfactant/oil ratios are given in Table 2 below together with the test dam. It is to be noted that anionic surfactants are superior to nonionic or cationic surfactants in providing the required property without affecting mud rheology. Sulphonates appear to be the best artionic surfactants.

It is to be noted that Petromix 9 already includes oil and the Petronates are listed in ascending order of molecular weight.

TABLE 1-continued

| Oil | Stickance Ratio | Fluid loss (ml) |
|---|---|---|
| Peanut | 0.38 | 1.2 |
| Safflower | 0.43 | 1.4 |
| Shellsol | 0.48 | 1.0 |

TABLE 2

| Tradename | Composition | Surfactant/ oil ratio | Stickance ratio | Fluid loss (mL) |
|---|---|---|---|---|
| — | Standard WBM | — | 1.0 | 3.2 |
| — | Standard WBM + oil | — | 0.9 | 2.2 |
| Standard WBM + Additive (Anionic surfactant) | | | | |
| Petromix 9 | Petroleum sulphonate blend | 3:2 | 0.2 | 0.4 |
| Petronate L | Petroleum sulphonate | 3:2 | 0.31 | 1.3 |
| Petronate BL | Petroleum sulphonate | 3:2 | 0.43 | 1.0 |
| Petronate H | Petroleum sulphonate | 3:2 | 0.36 | 1.6 |
| Petronate HH | Petroleum sulphonate | 3:2 | 0.26 | 1.4 |
| Roval IDBS | IDBS | 3:2 | 0.63 | 1.4 |
| Sulframin 1250 | NaDBS | 3:1 | 0.71 | 1.8 |
| — | KDBS | 3:2 | 0.55 | 1.9 |
| Sulframin AOS | Sodium dodecyl sulphonate | 2:3 | 0.73 | 2.0 |
| ROVAL 70PG | Dioctyl sulphosuccinate | 3:2 | 0.57 | 1.5 |
| EMPHOS 20 PS21A | Organic phosphate ester | 2:3 | 1.81 | 13.5 |
| TWEEN 20 | Polyoxyethylene sorbitan monolaurate | 3:2 | 1.46 | 6.2 |
| Standard WBM + Additive (Nonionic surfactant) | | | | |
| Synperonic 91/4 | Alkyl phenol ethoxylate | 3:2 | 0.29 | 7.0 |
| Rewo RO 40 | Ethoxylated caster oil | 3:2 | 2.9 | 9.2 |
| Standard WBM + Additive (Cationic surfactant) | | | | |
| Ethoxamine SF11 | Ethoxylated fatty amine | 3:2 | 0.71 | 3.3 |
| Sochamine 35 | Imidazoline | 3:2 | 0.56 | 8.2 |

EXAMPLE 3

(Micro) emulsion additives are created by mixing anionic surfactant, IDBS, and various oils in a ratio of 3:2 (by volume). These mixtures are then added to the standard mud described above at 5% by volume level and stickance tests performed. The results of these tests are given in Table 1 below. The fluid loss figures relate to a 30 minute loss test from a HPHT filtration cell at 200 psi differential pressure.

TABLE 1

| Oil | Stickance Ratio | Fluid loss (ml) |
|---|---|---|
| Plantohyd | 0.34 | 1.5 |
| Fish | 0.32 | 1.4 |
| Corn | 0.33 | 1.4 |

EXAMPLE 5

Cosurfactants can be used to enhance and extend the performance of microemulsion additives by modifying the droplet size over the range of operating conditions used. The cosurfactants are characterised in that they produce no reduction in sticking when used on their own but provide an improvement when added to a surfactant/oil mixture. Table 3 below summarises the effect of various cosurfactants with regard to the performance of a standard WBM including Petronate L as an additive.

TABLE 3

| Cosurfactant | % by volume of Petronate L in mud | Stickance Ratio | Fluid Loss (ml) |
| --- | --- | --- | --- |
| — | 5.0 (no oil) | 0.31 | 1.4 |
| — | 3.0 (no oil) | 0.65 | 1.4 |
| — | 3.0 | 0.41 | 1.2 |
| Ethylene glycol | 2.5 | 0.30 | 0.9 |
| Diethylene glycol | 2.5 | 0.33 | 1.3 |
| Soft soap | 3.0 | 0.41 | 0.9 |
| Soft soap/Ethylene glycol | 2.5 | 0.35 | 1.2 |
| Sulframin AOS | 3.0 | 0.38 | 0.9 |
| Sulframin AOS/Ethylene glycol | 2.5 | 0.36 | 1.3 |

In Table 3, the soft soap used is the potassium salt of a long chain carboxylic acid and Sulframin AOS is the sodium salt of dodecyl benzene sulphonic acid (an artionic surfactant). Sulframin AOS differs from the other cosurfactants in that it will produce a reduction in sticking when used on its own.

EXAMPLE 6

In order to form a micellar phase additive it is necessary for the surfactant used to be added to the mix-water used to make up the mud. If the surfactant is added directly to the mud it may interfere with the clay-clay interactions and cause gelling. Table 4 below shows the performance of various additives formed from the isopropylamine (IDBS) or other salts of dodecyl benzene sulphonic acid. In each case the mud contains surfactant at 5% by volume.

TABLE 4

| Surfactant | Stickance Ratio | Fluid Loss (ml) |
| --- | --- | --- |
| IDBS | 0.19 | 1.1 |
| NaDBS | 0.90 | 3.0 |
| KDBS | 0.22 | 1.3 |
| CaDBS | 0.39 | 1.6 |

EXAMPLE 7

Even when the suffactant is mixed with water prior to mixing into the mud, some effect can be seen on the theology of the resulting mud. This can be controlled with traditional additives as can be seen in Table 5 below.

TABLE 5

| Composition | Plastic Viscosity (cP) | Yield Point (Pa) |
| --- | --- | --- |
| Base mud | 66 | 48 |
| Base mud + 5% IDBS | 60 | 72 |
| Base mud, 5% IDBS + 0.15% thinner | 53 | 54 |

EXAMPLE 8

Combination of surfactants such as anionic and nonionic surfactants can be used to provide the desired effect. A suitable mixture might comprise sodium and isopropylamine salts of dodecyl benzene sulphonic acid with coconut diethanolamide.

We claim:

1. A method of maintaining the rotation of a tubular within a wellbore during contact with a mud cake on the surface of the wellbore, comprising:

rotating a tubular within the wellbore;

providing a drilling mud into the wellbore, the drilling mud containing an additive comprising an aqueous dispersion of a particulate phase comprised substantially of particles, having a size range substantially completely within the size range of the pore size distribution of a mud cake; conditioning the mud with an effective amount of additive;

wherein a substantial portion of the particles are sized in the range of between 5 and 500 nm;

further wherein the particulate phase is dispersed in a substantially homogeneous phase form, the form selected from the group consisting of emulsions, microemulsions, and micellar phases;

the particulate phase being incorporated into the pores of the mud cake to condition the mud cake, thereby providing a conditioned mud cake of reduced yield strength and thereby reducing the sticking propensity of the mud cake against the tubular; and whereby the amount of the additive added to the drilling mud is determined by the amount of the drilling mud.

2. A method of maintaining the rotation of a tubular within a wellbore during contact with a mud cake on the surface of the wellbore, comprising:

rotating a tubular within a wellbore;

providing a drilling mud into the wellbore, the drilling mud containing an additive, wherein the additive comprises a well dispersed aqueous particulate phase comprised substantially of particles; conditioning the mud with an effective amount of additive;

forming a mud cake on the surface of the wellbore, the mud cake having an outer wellbore surface facing the rotating tubular and an inner surface that contacts the formation, the outer surface of the mud cake having pores of a particular pore size distribution;

incorporation into the mud cake of the particles, the particles having a size range substantially completely within the size range of the pore throat size distribution of a mud cake, the size range being between 5 and 500 nm, thereby facilitating uptake by the mud cake of an effective amount of particles, providing a conditioned mud cake with a resistance to shear stress of an amount less than a mud cake not containing the additive;

contacting the rotating tubular with the conditioned mud cake, the tubular camming against the outer surface of the conditioned mud cake;

deforming the conditioned mud cake by the force of the rotating tubular, thereby substantially avoiding tubular sticking and facilitating uninterrupted rotation of the tubular within the wellbore.

* * * * *